United States Patent [19]

Fung et al.

[11] Patent Number: 5,158,798
[45] Date of Patent: Oct. 27, 1992

[54] LOW-CALORIE FAT SUBSTITUTE

[75] Inventors: Fu-Ning Fung, Salem; James W. Miller, Ledyard; Michael T. Wuesthoff, Gales Ferry, all of Conn.

[73] Assignee: Pfizer Inc., New York, N.Y.

[21] Appl. No.: 636,549

[22] Filed: Jan. 11, 1991

Related U.S. Application Data

[63] Continuation-in-part of Ser. No. 475,576, Feb. 5, 1990, Pat. No. 5,082,684.

[51] Int. Cl.$^5$ ............................................. A23D 9/00
[52] U.S. Cl. .................................... 426/602; 426/603; 426/604; 426/659; 426/613; 426/572; 426/660; 426/589; 426/579; 426/804; 426/612; 426/573
[58] Field of Search ............... 426/601, 612, 603, 660, 426/604, 659, 611, 613, 804, 589

[56] References Cited

U.S. PATENT DOCUMENTS

| | | | |
|---|---|---|---|
| 3,892,881 | 7/1975 | Lissant | 426/611 |
| 3,917,859 | 11/1975 | Terada et al. | 426/612 |
| 4,305,970 | 12/1981 | Moran et al. | 426/603 |
| 4,308,294 | 12/1981 | Rispoli et al. | 426/613 |
| 4,652,458 | 3/1987 | Frost et al. | 426/601 |
| 4,849,242 | 7/1989 | Kershner | 426/601 |
| 4,849,243 | 7/1989 | Sreenivasan et al. | 426/603 |
| 4,915,974 | 4/1990 | D'Amelia | 426/601 |
| 4,956,193 | 9/1990 | Cain et al. | 426/613 |
| 4,963,368 | 10/1990 | Klemann | 426/601 |
| 4,973,489 | 11/1990 | Meyer et al. | 426/601 |
| 4,983,413 | 1/1991 | Meyer et al. | 426/601 |
| 5,017,398 | 5/1991 | Jandacek | 426/601 |

Primary Examiner—Jeanette Hunter
Attorney, Agent, or Firm—Peter C. Richardson; Paul H. Ginsburg; Robert F. Sheyka

[57] ABSTRACT

There is disclosed a low calorie fat substitute comprising an emulsion containing a non-flowable aqueous phase, an oil phase and a fat extender. Also disclosed are low calorie fat substitutes wherein the fat or oil is replaced by a fat mimetic.

54 Claims, No Drawings

LOW-CALORIE FAT SUBSTITUTE

This application is a continuation-in-part of application Ser. No. 475,576 filed on Feb. 5, 1990 now U.S. Pat. No. 5,082,684.

BACKGROUND OF THE INVENTION

The present invention is directed to low calorie fat substitutes. More specifically, it is directed to an emulsion containing an oil phase and an aqueous phase which is useful as a low calorie fat substitute.

In today's health conscious society, there is a growing demand for low calorie foods. Excess body weight not only creates a feeling of low self confidence in social situations but also has been shown to contribute to the impairment of the cardiovascular function of the individual. Moreover, the reduction of the performance capacity of the individual is another consequence of excess body weight.

Many approaches have been suggested to control excess body weight. The use of chemical appetite suppressants and appetite inhibitors is a well known approach but these chemical agents are often unsafe for long term use and/or may have undesirable side effects. Moreover, they are usually available only through a physician's prescription.

Low calorie foods have also been widely advocated as a diet regimen to control excess body weight. Such low-calorie foods include low calorie spreads, which are typically water-in-oil emulsions; and low calorie sauces, such as salad dressings and mayonnaise which are typically oil-in-water emulsions.

Recently water-in-oil-in-water emulsions (w/o/w) have been described as additives for low calorie foods. Such w/o/w emulsions are described in U.S. Pat. Nos. 4,650,690, 4,632,840 and 4,590,086.

U.S. Pat. No. 4,238,520 refers to a low fat comestible spread which is an oil-in-water emulsion containing about 20% to about 40% fat, a lipoidal emulsifier, and a water-soluble or dispersible thickening agent. The fat is chosen to impart a plastic-like consistency to the emulsion.

U.S. Pat. No. 4,284,655 refers to a flavored comestible spread which is an oil-in-water dispersion comprising water, a partial glyceride ester composition containing about 38-48% diglyceride or monoglyceride in the ratio of about 1:5 to 1:1.5 based on the diglyceride content, and triglyceride in an amount less than the mono and diglyceride contents combined.

U.S. Pat. No. 4,305,964 refers to food products comprising a continuous aqueous phase and a dispersed gelled aqueous phase.

European Patent Application No. 244,009 refers to a spread containing a heated dairy cream.

European Patent Application No. 257,714 refers to a multifunctional fat-continuous emulsion. The composition is a water-in-oil emulsion with a proteinaceous aqueous phase, wherein the emulsifier system comprises mono fatty acid esters of both saturated and unsaturated fatty acids with a polyhydroxy alcohol.

European Patent Application No. 265,003 refers to a water-in-oil emulsion which contains a thickened proteinaceous aqueous phase, a fatty phase, an emulsifier and a mixture of phosphatides.

European Patent Application No. 279,498 refers to a plastified dispersion with a continuous fat phase and a dispersed aqueous phase with the dispersed phase containing less than 0.1% amino acid residues.

European Patent Application No. 279,499 refers to a plastified dispersion wherein the aqueous phase has a viscosity of less than 400 cps. at 35° C.

Great Britain Patent No. 1,564,800 refers to a low fat spread containing a gelled proteinaceous aqueous phase and a continuous fatty phase.

PCT application 88/04525 refers to a water in oil (w/o) emulsion which contains at least 25% crystallized fat.

U.S. Pat. No. 4,307,125 refers to a process for producing a low fat emulsion using a natural dairy cream and an emulsifier having a hydrophilic to lipophilic balance of about 3 to 5.

United Kingdom Patent Application No. 2,021,140 refers to a dairy blend comprising butter and vegetable oil.

United Kingdom Patent Application No. 1,277,772 refers to a fluid beverage comprising a mixture of whey solids and fat.

Great Britain Application No. 2,205,849 refers to a low fat spread containing an emulsifying agent, a continuous fatty phase and an aqueous phase containing protein, gelatin, starch and optionally hydrocolloids.

U.S. Pat. No. 3,726,690 refers to an acidified food containing fats, milk solids, an edible protein, an edible emulsifier and a Xanthomonas colloid.

U.S. Pat. No. 4,414,236 refers to an edible w/o emulsion with a gelled aqueous phase containing a medium melting point gelling agent, i.e. xanthans, carrageenans and locust bean gum.

U.S. Pat. No. 4,389,426 refers to a w/o emulsion with a gelled phase containing two hydrocolloids.

U.S. Pat. No. 4,362,758 refers to a process for making a low calorie food spread by producing an oil-in-water emulsion having 1% protein in the aqueous phase.

U.S. Pat. No. 4,305,970 refers to an edible fat spread of the water-in-oil emulsion type containing a continuous fatty phase, a dispersed liquid aqueous phase, and dispersed gelled aqueous ingredients.

U.S. Pat. No. 4,468,408 refers to a low-fat, butter-flavored oil in water liquid spread with a dispersed phase having 5 to 40 percent fat and a continuous phase comprising 65-92% water with stabilizers.

U.S. Pat. No. 4,031,261 refers to a hard-frozen beverage containing fat and a film-forming protein.

Fat mimetics, or fat substitutes which have the organoleptic qualities of natural fats but do not have the caloric values, have also been proposed as part of a low calorie regimen. These fat mimetics are referred to in a number of patents.

U.S. Pat. No. 3,600,186 refers to polyols of sugar fatty acid polyesters, including Olestra ®.

U.S. Pat. No. 3,637,774 refers to polyglycerol fatty acid polyesters.

European Patent Application No. 303523 refers to fatty acid/fatty alcohol carboxy/carboxylate esters.

European Patent Application No. 254547 refers to fatty acid esters of epoxide-extended polyols.

European Patent Application No. 205273 refers to polysiloxanes.

U.S. Pat. No. 4,849,242 refers to polyoxyalkylene fatty acid esters.

U.S. Pat. No. 4,508,746 refers to fatty alcohol esters of polycarboxylic acids.

U.S. Pat. No. 4,582,927 refers to malonic acid fatty alcohol diesters, alkyl malonic acid fatty alcohol diesters and dialkyl malonic acid fatty alcohol diesters.

U.S. Pat. No. 4,942,054 refers to alkyl glycoside fatty acid polyesters.

U.S. Pat. No. 4,582,715 refers to alpha-acylated fatty acid triglycerides.

Canadian Patent No. 1,106,681 refers to glycerol fatty alcohol diethers and monoglyceride fatty alcohol diethers.

U.S. Pat. No. 3,579,548 refers to glycerol esters of alpha-branched carboxylic acids.

SUMMARY OF THE INVENTION

In one embodiment, the present invention is directed to an emulsion useful as a low calorie fat substitute comprising:

(a) from about 1 to about 95 percent of an aqueous phase rendered non-flowable by the addition of a suitable amount of a gel-forming composition;

(b) from about 5 to about 99 percent of an oil phase, comprising a fat or oil and an emulsifier;

(c) from about to about 90 percent of a fat extender;

wherein the interaction between components (a),(b) and (c) results in said emulsion being pourable.

Preferred is the emulsion containing from about 50 to about 85 percent of said aqueous phase and from about 15 to about 50 percent of said oil phase.

Preferred is the emulsion wherein the gel-forming composition is selected from the group consisting of agar, gelatin, pectins, and carrageenans.

Also preferred is the emulsion wherein said gel-forming composition is selected from the group consisting of alginates, xanthans, carrageenans, succinoglycans, and scleroglucans, cross-linked with an appropriate cross-linking agent.

Especially preferred is the emulsion wherein said gel-forming composition is carrageenan cross-linked with calcium or potassium salts; or combinations thereof.

Also preferred is the emulsion wherein said gel-forming composition is xanthan gum combined with locust bean gum or guar gum; and combinations therein.

Preferred is the emulsion wherein said gel-forming composition is present at a concentration of from about 0.1 to about 3.0 percent of the aqueous phase.

Preferred is the emulsion wherein the gel-forming composition is agar, and is present at a concentration of from about 0.3 to about 0.7 percent of the aqueous phase.

Also preferred is the emulsion wherein the gel-forming composition is alginate cross-linked with a calcium salt, with said cross-linked alginate being present at from about 0.5 to about 1.5 percent of the aqueous phase.

Especially preferred is the emulsion wherein said gel-forming composition is carrageenan, and is present at from about 0.7 to about 2.0 percent of the aqueous phase.

Also especially preferred is the emulsion wherein said gel-forming composition is carrageenan cross-linked with a potassium or calcium salt, with said cross-linked carrageenan being present at a concentration of from about 0.3 to about 1.5 percent of the aqueous phase.

Also especially preferred is the emulsion wherein said gel-forming composition is formed by addition of a suitable acidifying agent to a suitable amount of alginate.

Preferred emulsifiers are selected from the group consisting of lecithins, polyol fatty acid esters, monoglycerides, diglycerides, diacetyltartaric acid esters of mono- and diglycerides, monosodium phosphate derivatives of mono- and diglycerides, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, citric, acetic, and succinic with mono- and diglycerides, esters of acids selected from the group consisting of fumaric, lactic, tartaric, and citric with fatty acids or fatty alcohols; and combinations thereof.

Especially preferred emulsifiers are mono- and diglycerides; and combinations thereof.

Preferred fats or oils are selected from the group consisting of vegetable fats and oils, animal fats, anhydrous milkfat, hydrogenated vegetable oils, partially hydrogenated vegetable oils, partially hydrogenated palm kernel oil; and combinations thereof.

Especially preferred fats or oils are partially hydrogenated palm kernel oil, partially hydrogenated vegetable oils, and anhydrous milkfat; and combinations thereof.

Also preferred is the emulsion further comprising the addition of a suitable pH adjusting agent with preferred pH adjusting agents being selected from acids selected from the group consisting of phosphoric, acetic, lactic, malic, adipic, fumaric, tartaric, citric, hydrochloric and sulfuric acids; salts thereof; glucono delta lactone; and combinations thereof.

Preferred is the emulsion wherein said fat extender is selected from the group consisting of dextrins, maltodextrins, modified starches, microcrystalline cellulose, polydextrose, and microparticulated proteins, and combinations thereof, with said fat extender present at a concentration of from about 1 to about 90 percent of the emulsion by weight, preferably at from about 5 to about 45 percent of the emulsion by weight.

Also preferred is the emulsion wherein at least a part of said fat or oil is replaced by an incompletely digestible fat mimetic, with said incompletely digestible fat mimetic selected from the group consisting of sugar fatty acid polyesters, polyol fatty acid polyesters, polyglycerol fatty acid polyesters, fatty acid/ fatty alcohol carboxy/carboxylate esters, fatty acid esters of epoxide-extended polyols, polysiloxanes, polyoxyalkylene fatty acid esters, fatty alcohol esters of polycarboxylic acids, malonic acid fatty alcohol diesters, alkyl malonic acid fatty alcohol diesters, dialkyl malonic acid fatty alcohol diesters, alkyl glycoside fatty acid polyesters, alpha-acylated fatty acid triglycerides, glycerol fatty alcohol diethers, monoglyceride fatty alcohol diethers, and glycerol esters of alpha-branched carboxylic acids; and combinations thereof.

Especially preferred is the emulsion wherein said incompletely digestible fat mimetic is sucrose fatty acid polyester.

In another embodiment, the present invention is directed to a process for preparing an emulsion comprising:

(a) mixing an aqueous medium, a gel-forming composition, a fat or oil, a fat extender, and an appropriate emulsifier;

(b) stirring at a temperature and shear rate sufficient to produce an emulsion or dispersion of the fat or oil with the aqueous medium; and (c) stirring as said emulsion or dispersion is cooled to a temperature of from about 5° C. to about 30° C.

Preferred is the process wherein said fat extender is selected from the group consisting of dextrins, maltodextrins, modified starches, microcrystalline cellulose, polydextrose, and microparticulated proteins, and combinations thereof, with said fat extender present at a concentration of from about 1 to about 90 percent of the emulsion by weight, preferably at from about 5 to about 45 percent of the emulsion by weight.

Also preferred is the process wherein at least a part of said fat or oil is replaced by an incompletely digestible fat mimetic, with said incompletely digestible fat mimetic selected from the group consisting of sugar fatty acid polyesters, polyol fatty acid polyesters, polyglycerol fatty acid polyesters, fatty acid/ fatty alcohol carboxy/carboxylate esters, fatty acid esters of epoxide-extended polyols, polysiloxanes, polyoxyalkylene fatty acid esters, fatty alcohol esters of polycarboxylic acids, malonic acid fatty alcohol diesters, alkyl malonic acid fatty alcohol diesters, dialkyl malonic acid fatty alcohol diesters, alkyl glycoside fatty acid polyesters, alpha-acylated fatty acid triglycerides, glycerol fatty alcohol diethers, monoglyceride fatty alcohol diethers, and glycerol esters of alpha-branched carboxylic acids.

Especially preferred is the process wherein said incompletely digestible fat mimetic is sucrose fatty acid polyester.

Also preferred is the process further comprising the addition of a suitable pH adjusting agent, with preferred pH adjusting agents being selected from the group consisting of acids selected from the group consisting of phosphoric, acetic, lactic, malic, adipic, fumaric, tartaric, citric, hydrochloric and sulfuric; salts thereof; glucono delta lactone; and combinations thereof.

The present invention is also directed to a foodstuff having at least a portion of the normally present triglyceride replaced by an emulsion of the present invention.

Preferred foods into which an emulsion of the present invention may be incorporated are frozen desserts, salad dressings, dips for chips, crackers or vegetables, spreads, confections, whipped toppings, frostings or icings for cakes or cookies, fillings for cakes or cookies, whipped or gelled desserts, puddings, beverages, baked goods, and soups.

In yet another embodiment, the present invention is directed to a method of reducing the fat content of a food containing triglycerides comprising replacing at least a portion of the normally present triglyceride with the pourable emulsion of the present invention.

In still another preferred embodiment, the present invention is directed to a method of reducing the fat content of a food containing triglycerides comprising replacing at least a portion of the normally present triglyceride with an emulsion comprising:

(a) from about 1 to about 95 percent of an aqueous phase rendered non-flowable by the addition of a suitable amount of a gel-forming composition; and (b) from about 5 to about 99 percent of an oil phase comprising a fat or oil and an emulsifier; and (c) from about 1 to about 99 percent of a fat extender; said emulsion processed to render said emulsion nonpourable.

Preferred is the method wherein said fat extender is selected from the group consisting of dextrins, maltodextrins, modified starches, microcrystalline cellulose, polydextrose, and microparticulated proteins, and combinations thereof, with said fat extender present at a concentration of from about 1 to about 90 percent of the emulsion by weight, preferably at from about 5 to about 45 percent of the emulsion by weight.

Also preferred is the method wherein at least a part of said fat or oil is replaced by an incompletely digestible fat mimetic, with said incompletely digestible fat mimetic selected from the group consisting of sugar fatty acid polyesters, polyol fatty acid polyesters, polyglycerol fatty acid polyesters, fatty acid/ fatty alcohol carboxy/carboxylate esters, fatty acid esters of epoxide-extended polyols, polysiloxanes, polyoxyalkylene fatty acid esters, fatty alcohol esters of polycarboxylic acids, malonic acid fatty alcohol diesters, alkyl malonic acid fatty alcohol diesters, dialkyl malonic acid fatty alcohol diesters, alkyl glycoside fatty acid polyesters, alpha-acylated fatty acid triglycerides, glycerol fatty alcohol diethers, monoglyceride fatty alcohol diethers, and glycerol esters of alpha-branched carboxylic acids; and combinations thereof.

Especially preferred is the method wherein said incompletely digestible fat mimetic is sucrose fatty acid polyester.

Also forming a part of the present invention are foodstuffs having at least a portion of the normally present triglyceride replaced by an emulsion comprising:

(a) from about 1 to about 95 percent of an aqueous phase rendered non-flowable by the addition of a suitable amount of a gel-forming composition; and (b) from about 5 to about 99 percent of an oil phase comprising a fat or oil and an emulsifier; and (c) from about 1 to about 99 percent of a fat extender said emulsion processed to render said emulsion nonpourable.

Preferred is the foodstuff wherein said fat extender is selected from the group consisting of dextrins, maltodextrins, modified starches, microcrystalline cellulose, polydextrose, and microparticulated proteins, and combinations thereof, with said fat extender present at a concentration of from about 1 to about 90 percent of the emulsion by weight, preferably at from about 5 to about 45 percent of the emulsion by weight.

Also preferred is the foodstuff wherein at least a part of said fat or oil is replaced by an incompletely digestible fat mimetic, with said incompletely digestible fat mimetic selected from the group consisting of sugar fatty acid polyesters, polyol fatty acid polyesters, polyglycerol fatty acid polyesters, fatty acid/ fatty alcohol carboxy/carboxylate esters, fatty acid esters of epoxide-extended polyols, polysiloxanes, polyoxyalkylene fatty acid esters, fatty alcohol esters of polycarboxylic acids, malonic acid fatty alcohol diesters, alkyl malonic acid fatty alcohol diesters, dialkyl malonic acid fatty alcohol diesters, alkyl glycoside fatty acid polyesters, alpha-acylated fatty acid triglycerides, glycerol fatty alcohol diethers, monoglyceride fatty alcohol diethers, and glycerol esters of alpha-branched carboxylic acids; and combinations thereof.

Especially preferred is the foodstuff wherein said incompletely digestible fat mimetic is sucrose fatty acid polyester.

Preferred foods into which the nonpourable emulsion may be incorporated are frozen desserts, salad dressings, dips for chips, crackers or vegetables, spreads, confections, whipped toppings, frostings or icings for cakes or cookies, fillings for cakes or cookies, whipped or gelled desserts, puddings, beverages, baked goods, and soups.

In yet another embodiment, the present invention is directed to a two phase emulsion useful as a low calorie fat substitute comprising:

(a) from about 1 to about 95 percent of an aqueous phase rendered non-flowable by the addition of a suitable amount of a gel-forming composition;

(b) from about 5 to about 99 percent of an oil phase comprising a fat mimetic and an emulsifier.

In yet another embodiment, the present invention is directed to a method of reducing the fat content of a foodstuff containing triglycerides by replacing at least a part of the normally present triglyceride with an emulsion containing the fat mimetic.

Preferred emulsions with the fat mimetic are those which are either pourable or nonpourable.

Preferred foodstuffs into which either the nonpourable or pourable emulsion with the fat mimetic may be added are selected from the group consisting of frozen desserts, salad dressing, dips for chips, crackers or vegetables, spreads, confections, whipped toppings, frostings or icings for cakes or cookies, fillings for cakes or cookies, whipped desserts, puddings, beverages, soups and baked goods.

DETAILED DESCRIPTION OF THE INVENTION

The aqueous gel-forming compositions used in the present invention are formed by dissolving a gel-forming composition in an aqueous medium. Examples of gel-forming compositions are agar, carrageenans, gelatin, and pectins. The amount of the gel-forming composition to be dissolved in the aqueous medium to form the aqueous gel-forming composition is readily determined by a person of ordinary skill in the art.

Preferred also is the aqueous gel-forming composition formed by combining, in an aqueous medium, a gel-forming amount of an appropriate polysaccharide with a salt of a metal cation capable of cross-linking said polysaccharide. Preferred metal cations are food grade metal cations. Preferred aqueous gel-forming compositions are those wherein the gel-forming polysaccharide is selected from the group consisting of alginates, succinoglycans, carrageenans, xanthans, and scleroglucans, and the metal cation is calcium (II) or magnesium (II). Another preferred aqueous gel-forming composition is that wherein the gel-forming polysaccharide is carrageenan and the metal cation is calcium (II) or potassium (I). Another preferred gel-forming composition is formed by combining a xanthan with locust bean gum or guar gum.

The gel-forming composition is present, based on the weight of the aqueous phase, at from about 0.1 to about 3.0 percent of the aqueous phase. As is well known to one skilled in the art, the amount of gel-forming composition necessary to render the aqueous phase non-flowable depends on the nature of the gel-forming composition. Thus, the above ranges are subject to variations depending on the gel-forming composition used. For instance, if agar is used, it will be present in the aqueous phase at a concentration of from about 0.3 to about 0.7 percent. If carrageenan is used, it will be present in the aqueous phase at a concentration of from about 0.7 to about 2.0 percent. If cross-linked carrageenan is used, it will be present in the aqueous phase at a concentration of from about 0.3 to about 1.5 percent. If cross-linked alginate is used, it will be present in the aqueous phase at a concentration of from about 0.5 to about 1.5 percent.

Another suitable gel-forming composition is formed by adding an acidifying agent to an alginate. Suitable acidifying agents include acids such as hydrochloric, acetic, citric, phosphoric, fumaric, tartaric, and succinic acid.

The emulsion also contains an emulsifier. Preferred commercially available emulsifiers are lecithins, mono- and diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, and citric acid with fatty acids or fatty alcohols, esters of acids selected from the group consisting of fumaric, lactic, tartaric, citric, acetic and succinic with mono- or diglycerides; and combinations thereof.

The oil phase of the emulsion also contains, based on the weight of the total emulsion, from about 5 to about 99 percent, preferably from about 15 to about 50 percent, of an edible fat or oil. Suitable fats and oils include animal fats, vegetable fats and oils, anhydrous milkfat, hydrogenated vegetable oils, partially hydrogenated vegetable oils, partially hydrogenated palm kernel oils; and combinations thereof.

The pH of the emulsion may, if desired, be controlled by addition of one or more pH adjusting agents. Suitable pH adjusting agents are added at a concentration of from about 0.1 to about 3.0 percent, preferably 0.1–1.0 percent, based on the weight of the emulsion. Examples of pH adjusting agents are fumaric, hydrochloric, sulfuric, phosphoric, acetic, lactic, adipic, malic, tartaric or citric acid; salts thereof; glucono delta lactone; and combinations thereof.

The emulsion of the present invention contains an aqueous phase which is rendered non-flowable by the addition of a gel-forming composition. By "non-flowable" is meant that if the aqueous phase were made up separately, apart from the emulsion, it would not flow or conform to its container in the manner of a liquid. Although the aqueous phase is non-flowable, the interaction between the aqueous phase and the oil phase results in the emulsion being pourable. By "pourable" is meant that the emulsion retains substantially liquid characteristics, and can easily be transferred from one container to another by pouring.

For incorporation of either the pourable or the nonpourable emulsion of the present invention into a foodstuff which does not contain a large amount of water, it may be desirable to add a water-binding composition to the emulsion to decrease the water activity of the aqueous phase. This serves to decrease osmotic effects, whereby water is lost from the emulsion to other components of the foodstuff, thus possibly destabilizing the emulsion. As is well known to those skilled in the art, decreasing the water activity of the aqueous phase can have the further beneficial effect of decreasing susceptibility of the emulsion to microbial growth.

As used herein the term "water-binding composition" is defined as a substance which, when combined with water, decreases the availability of the water for physical, chemical, or metabolic processes.

Non-limiting examples of such water-binding compositions include soluble carbohydrates (e.g. sucrose, polydextrose), insoluble carbohydrates (e.g. microcrystalline cellulose, micronized bran), polyols (e.g. sorbitol, glycerol), proteins (e.g. whey protein), inorganic salts (e.g. sodium chloride), carboxylic acids (e.g. citric aid), salts of carboxylic acids (e.g. sodium acetate); and combinations thereof.

It has now surprisingly been found that certain carbohydrates, when added to either the pourable or nonpourable emulsion of the present invention, function as fat extending compositions, thereby reducing the level of fat in the emulsion. Non-limiting examples of such carbohydrates are dextrins, maltodextrins, microcrystalline cellulose, and polydextrose; and combinations thereof.

Other fat extending compositions may also be added to the pourable or non-pourable emulsion of the present invention. Non-limiting examples of such fat extenders are modified starches and microparticulated proteins; and combinations thereof.

As used herein, the term "fat-extending composition" is defined as a substance which can be used to replace a portion of the fat in a food.

The fat extending composition is present at a concentration of from about 1 to about 90 percent, preferably at from about 5 to about 45 percent of the emulsion by weight.

Moreover, part of the fat or oil which is used in an emulsion of the present invention can also be replaced by a fat mimetic. By the term "fat mimetic" is meant a substance which has the organoleptic qualities of a fat or oil, i.e. taste and mouthfeel, but does not have the caloric value. Preferably, the fat mimetic is incompletely digestible.

Examples of incompletely digestible fat mimetics are sugar fatty acid polyesters, polyol fatty acid polyesters, polyglycerol fatty acid polyesters, fatty acid/fatty alcohol carboxy/carboxylate esters, fatty acid esters of epoxide-extended polyols, polysiloxanes, polyoxyalkylene fatty acid esters, fatty alcohol esters of polycarboxylic acids, malonic acid fatty alcohol diesters, alkyl malonic acid fatty alcohol diesters, dialkyl malonic acid fatty alcohol diesters, alkyl glycoside fatty acid polyesters, alpha-acylated fatty acid triglycerides, glycerol fatty alcohol diethers, monoglyceride fatty alcohol diethers, and glycerol esters of alpha-branched carboxylic acids; and combinations thereof. An especially preferred fat mimetic is sucrose fatty acid polyester.

Emulsions of the present invention are useful as fat substitutes, replacing at least a portion of the normally present triglycerides in a foodstuff. Some emulsions of the present invention can be substituted for triglycerides on a substantially equal weight basis. Other emulsions with lower water content, also within the scope of the present invention, are useful as concentrated fat substitutes. Because of their low water content, such emulsions can be shipped and stored economically, and have improved microbiological stability. During formulation of a food with a concentrated emulsion, water is added to the emulsion either before or during addition of other food ingredients.

Preferred foods into which the present emulsion may be incorporated are salad dressings, frozen desserts, soups, dips for chips, crackers or vegetables, mayonnaise, fillings for cakes and cookies, confections, cake frosting, whipped desserts, gelled desserts, beverages, puddings, and baked goods.

The emulsion of the present invention is prepared by mixing an aqueous medium, a gel-forming composition, a fat or oil, a fat extender and an appropriate emulsifier, stirring at a temperature and shear rate sufficient to produce an emulsion, and then cooling the resultant emulsion. If the gel-forming composition includes a cross-linking agent or gelation promoter, this is preferably added to the stirred emulsion prior to cooling.

The same process can be used to prepare a nonpourable emulsion, also useful as a low-calorie fat substitute. While it is not intended that the scope of the invention be limited by any particular theory, the following observations appear to apply in most cases: (1) only fats which are solid or semisolid at room temperature give nonpourable emulsions. (2) Decreasing the plasticity of the fat increases emulsion viscosity. (3) Increasing the percentage of fat in the emulsion increases emulsion viscosity; emulsions containing more than about 50% of solid or semisolid fat are usually nonpourable. (4) Increasing gelant concentration increases emulsion viscosity. Further, it has been observed that either homogenization or an increase in emulsifier level usually, although not always, increases emulsion viscosity.

In either concentrated or non-concentrated form, the nonpourable emulsion of the present invention can be used to replace at least a portion of the normally present triglycerides in a foodstuff, and is useful in the same foods as the pourable emulsion. The nonpourable emulsion sometimes shows better functionality than the pourable emulsion in foods which are themselves highly viscous and have a high fat content, such as cookie fillings and certain frostings for cakes or cookies.

The invention having been described in general terms, reference is now made to specific examples. It is to be understood that these examples are not meant to limit the present invention, the scope of which is determined by the appended claims.

EXAMPLE 1

Nonpourable Emulsion

Agar Gel - Milkfat - Maltodextrin

An agar solution was prepared by dissolving 13.4 grams of food-grade agar in 986.6 grams of distilled water with stirring and heating to 95° C. The agar solution was cooled to about 70° C., 150 grams of Maltrin M040 (Grain Processing Corp. maltodextrin) was added with stirring, and the resulting solution was added with stirring to a hot (60° C.) solution of 25 grams of Dur-Em 117 emulsifier (Durkee Industrial Foods Corp. mono- and diglycerides) in 350 grams of molten anhydrous milkfat (Mid-America Farms). Stirring was continued for about 10 minutes while the mixture cooled to 25°–30° C. The resulting emulsion was passed through a two-stage homogenizer (2500 pounds per square inch followed by 500 pounds per square inch), then stored in a refrigerator at approximately 5° C. for 24 hours prior, to use.

EXAMPLE 2

Pourable Emulsion

Agar Gel - Milkfat - Maltodextrin

An agar solution was prepared by dissolving 7.5 grams of food-grade agar in 992.5 grams of distilled water with stirring and heating to 95° C. The agar solution was cooled to about 70° C., 223 grams of Maltrin M040 (Grain Processing Corp. maltodextrin) was added with stirring, and the resulting solution was added with stirring to a hot (60° C.) solution of 16.5 grams of Dur-Em 117 emulsifier (Durkee Industrial Foods Corp. mono- and diglycerides) in 100 grams of molten anhydrous milkfat (Mid-America Farms). Stirring was continued for about 10 minutes while the mixture cooled to 25°-30° C. The resulting emulsion was passed through a two-stage homogenizer (2500 pounds per square inch followed by 500 pounds per square inch), then stored in a refrigerator at approximately 5° C. for 24 hours prior to use.

EXAMPLE 3

Pourable Emulsion

Agar Gel - Partially Hydrogenated Soybean Oil - Maltodextrin

An agar solution was prepared by dissolving 5.0 grams of food-grade agar in 995 grams of distilled water with stirring and heating to 95° C. The agar solution was cooled to about 70° C., 300 grams of Maltrin M040 (Grain Processing Corp. maltodextrin) was added with stirring, and the resulting solution was added with stirring to a hot (60° C.) solution of 25.0 grams of Dur-Em 117 emulsifier (Durkee Industrial Foods Corp. mono- and diglycerides) in 200 grams of molten Tem Cote IE fat (Bunge Foods partially hydrogenated soybean and cottonseed oil). Stirring was continued for about 10 minutes while the mixture cooled to 25°-30° C. The resulting emulsion was passed through a two-stage homogenizer (2500 pounds per square inch followed by 500 pounds per square inch), then stored in a refrigerator at approximately 5° C. for 24 hours prior to use.

EXAMPLE 4

Pourable Emulsion

Agar Gel - Partially Hydrogenated Soybean Oil - Maltodextrin

The procedure of Example 3 was followed, except that 450 grams of Maltrin M040 and 50.0 grams of Tem Cote IE fat were substituted for the quantities of these ingredients used in Example 3.

EXAMPLE 5

Frozen Dessert

| Ingredients | Weight percent |
|---|---|
| Fat-gel-maltodextrin emulsion prepared according to Example 1 | 9.1 |
| Sucrose | 15.0 |
| Powdered skim milk | 14.0 |
| Vanilla extract | 1.0 |
| Dricoid 200 (emulsifier-stabilizer manufactured by Kelco Division of Merck and Co., containing mono and diglycerides, guar gum, xanthan gum, carrageenan, and citric acid) | 0.2 |
| Water | 60.7 |
| Total | 100.0 |

The water was preheated to 70° C. and transferred to a kitchen blender. With the blender running at medium speed, the Dricoid 200 was added, blending was continued for 3 minutes, the powdered skim milk and sucrose were added, and blending was continued for 3 minutes. The fat-gel-maltodextrin emulsion was added and blending was continued for 5 minutes. The resulting mixture was pasteurized by heating to 70° C. for 30 minutes, homogenized at 2500 pounds per square inch, homogenized again at 500 pounds per square inch, rapidly cooled in an ice bath, and stored under refrigeration overnight. The vanilla extract was added with stirring, and the mixture was frozen with a small commercial ice cream freezer (Taylor Model 103). The resulting low-fat ice cream, containing 2.1% fat, was judged by a taste panel to be organoleptically acceptable (rating above 5 on a 9-point scale).

EXAMPLE 6

Frozen Dessert

| Ingredients | Weight percent |
|---|---|
| Fat-gel-maltodextrin emulsion prepared according to Example 2 | 12.0 |
| Sucrose | 15.0 |
| Powdered skim milk | 14.0 |
| Vanilla extract | 1.0 |
| Dricoid 200 (emulsifier-stabilizer manufactured by Kelco Division of Merck and Co., containing mono and diglycerides, guar gum, xanthan gum, carrageenan, and citric acid) | 0.2 |
| Water | 57.8 |
| Total | 100.0 |

The water was preheated to 70° C. and transferred to a kitchen blender. With the blender running at medium speed, the Dricoid 200 was added, blending was continued for 3 minutes, the powdered skim milk and sucrose were added, and blending was continued for 3 minutes. The fat-gel-maltodextrin emulsion was added and blending was continued for 5 minutes. The resulting mixture was pasteurized by heating to 70° C. for 30 minutes, homogenized at 2500 pounds per square inch, homogenized again at 500 pounds per square inch, rapidly cooled in an ice bath, and stored under refrigeration overnight. The vanilla extract was added with stirring, and the mixture was frozen with a small commercial ice cream freezer (Taylor Model 103) . The resulting low-fat ice cream, containing 1% fat, was judged by a taste panel to be organoleptically acceptable (rating above 5 on a 9 point scale).

EXAMPLE 7

Salad Dressing

| Ingredients | Weight percent | |
|---|---|---|
| Deionized water | 53.96 | A |
| Cider vinegar | 15.39 | A |
| Polysorbate 60 | 0.10 | A |
| Horseradish extract | 0.10 | A |
| Lemon juice | 0.10 | A |
| Mustard powder | 0.56 | B |
| Potassium sorbate | 0.10 | B |
| Sodium benzoate | 0.10 | B |
| Onion powder | 0.30 | B |
| Garlic powder | 0.30 | B |
| Worcester powder | 0.07 | B |
| Sugar | 2.00 | B |
| M100 maltodextrin (Grain Processing Corp.) | 1.70 | B |
| Salt | 1.12 | B |
| Xanthan gum | 0.70 | B |
| Propylene glycol alginate | 0.16 | B |
| Fat-gel-maltodextrin emulsion of Example 3 | 23.25 | |
| Total | 100.00 | |

The ingredients of group A were mixed in a bucket for one minute at approximately 2000 rpm, using a dispersator to maintain a strong vortex. With continued blending at approximately 3200 rpm, the ingredients of group B were added during a one-minute period. Blending speed was increased to approximately 3500 rpm for 2 minutes, then to approximately 4000 rpm for 3 minutes. The fat-gel-maltodextrin emulsion was added, and blending was continued for 15 minutes at approximately 7500 rpm. The mixture was then passed through a homogenizer at 2000 pounds per square inch. The resulting salad dressing, containing 3.0% fat, was judged by a taste panel to be organoleptically acceptable (rating above 5 on a 9 point scale).

EXAMPLE 8

Salad Dressing

The procedure of Example 7 was followed, except that the fat-gel-maltodextrin emulsion of Example 4 was substituted for the emulsion used in Example 7. The resulting salad dressing, containing 0.8% fat, was judged by a taste panel to be organoleptically acceptable (rating above 5 on a 9-point scale).

EXAMPLE 9

Nonpourable Emulsion

Agar Gel - Sucrose Polyester

An agar solution was prepared by dissolving 2.0 grams of food-grade agar in 198 grams of distilled water with stirring and heating to 95° C. While still hot (about 80° C.), 18.0 grams of the agar solution was added to a hot (70°-75° C.) solution of 0.45 gram of Dur-Em 207E emulsifier (Durkee Industrial Foods Corp. mono- and diglycerides) in 9.0 grams of sucrose polyester in a blender while stirring at low speed. The mixture was held at 70°-75° C with slow stirring for 30 min to effect pasteurization, then cooled to room temperature while stirring at medium speed during a period of about 25 minutes. The resulting emulsion was stored in a refrigerator overnight at approximately 5° C. prior to use.

EXAMPLE 10

Mayonnaise

| Ingredients | Weight Percent |
| --- | --- |
| Water A | 21.32 |
| Water B | 21.62 |
| Emulsion from Example 9 | 30.00 |
| Vinegar | 5.00 |
| Purity 420 starch (National Starch and Chemical Corp.) | 5.50 |
| Corn Sweet 55 corn sweetener (ADM Corn Sweeteners) | 5.00 |
| Lemon juice | 3.00 |
| Egg yolks, frozen with salt | 6.00 |
| Salt | 1.30 |
| Sodium benzoate | 0.10 |
| Potassium sorbate | 0.10 |
| Xanthan Gum | 0.30 |
| Mustard powder | 0.60 |
| Onion powder | 0.08 |
| White pepper | 0.04 |
| Garlic powder | 0.04 |
| Total | 100.00 |

The starch was stirred into water B and the mixture was cooked for 10 minutes at 88° C. Water A, vinegar, corn sweetener, egg yolks, and lemon juice were mixed in a blender at low speed for two minutes, xanthan gum was added, mixing was continued for 2 minutes, spices and preservatives were added, mixing was continued for 2 minutes, the emulsion was added, mixing was continued for 1 minute, the cooked starch mixture was added, and mixing was continued for 2.5 minutes at medium speed with the aid of a spatula to keep the material in the bottom of the mixing container. The resulting mixture was a stable, homogeneous emulsion with appearance and texture comparable to that of conventional oil-based mayonnaise prepared under comparable conditions.

We claim:

1. An emulsion useful as a low calorie fat substitute comprising:
   (a) from about 1 to 95 percent of an aqueous phase rendered non-flowable by the addition of a suitable amount of a gel-forming composition,
   (b) from about 5 to about 99 percent of an oil phase comprising a fat or oil and an emulsifier, and
   (c) from about 1 to about 90 percent of a fat extending composition; wherein the interaction between the concentration of components (a), (b) and (c) results in said emulsion being pourable.

2. The emulsion according to claim 1 wherein said aqueous phase is present at a concentration of from about 50 to about 85 percent and said fat or oil is present at a concentration of from about 15 to about 50 percent, based on the weight of the total emulsion.

3. The emulsion according to claim 1 wherein said gel-forming composition is selected from the group consisting of agar, gelatin, pectins, and carrageenans; and combinations thereof.

4. The emulsion according to claim 1 wherein said gel-forming composition comprises:
   (a) a composition selected from the group consisting of alginates, xanthans, carrageenans, succinoglycans, and scleroglucans; and
   (b) an appropriate cross-linking agent.

5. The emulsion according to claim 4 wherein, said composition is carrageenan and said cross-linking agent is selected from the group consisting of calcium or potassium salts; or combinations thereof.

6. The emulsion according to claim 1 wherein said gel-forming composition is xanthan gum combined with locust bean gum or guar gum; or combinations thereof.

7. The emulsion of claim 1 wherein said gel-forming composition is present at a concentration of from about 0.1 to about 3.0 percent of the aqueous phase.

8. The emulsion of claim 7 wherein said gel-forming composition is agar, and is present at a concentration of from about 0.3 to about 0.7 percent of the aqueous phase.

9. The emulsion of claim 1 wherein said gel-forming composition is alginate cross-linked with a calcium salt, and said cross-linked alginate is present at a concentration of from about 0.5 to about 1.5 percent of the aqueous phase.

10. The emulsion of claim 1 wherein said gel-forming composition is carrageenan, and is present at a concentration of from about 0.7 to about 2.0 percent of the aqueous phase.

11. The emulsion of claim 1 wherein said gel-forming composition is carrageenan cross-linked with a potassium or calcium salt, and said cross-linked carrageenan is present at a concentration of from about 0.3 to about 1.5 percent of the aqueous phase.

12. The emulsion according to claim 1 wherein said gel-forming composition is formed by addition of a suitable acidifying agent to a suitable amount of alginate.

13. The emulsion according to claim 1 wherein said emulsifier is selected from the group consisting of lecithins, monoglycerides, diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty, acid esters, sucrose fatty acid esters, esters of acids selected from the group consisting of fumaric, lactic, tartaric, or citric with fatty acids or fatty alcohols, esters of acids selected from the group consisting of fumaric, lactic, tartaric, citric, acetic, or succinic with mono- or diglycerides; and combinations thereof.

14. The emulsion according to claim 13 wherein said emulsifier is selected from the group consisting of mono- and diglycerides; and combinations thereof.

15. The emulsion according to claim 1, wherein said edible fat or oil is selected from the group consisting of vegetable fats and oils, animal fats, anhydrous milkfat, hydrogenated vegetable oils, partially hydrogenated vegetable oils, partially hydrogenated palm kernel oil; and combinations thereof.

16. The emulsion according to claim 15 wherein said fat or oil is selected from the group consisting of partially hydrogenated palm kernel oil, partially hydrogenated vegetable oils, and anhydrous milkfat; and combinations thereof.

17. The emulsion according to claim 1 further comprising the addition of at least one suitable pH adjusting agent.

18. The emulsion according to claim 17 wherein said pH adjusting agent is selected from the group consisting of acids selected from the group consisting of phosphoric, acetic, lactic, fumaric, adipic, malic, tartaric, citric, hydrochloric and sulfuric acids; salts thereof; glucono delta lactone; and combinations thereof.

19. The emulsion according to claim 1 wherein said fat extending composition is present at a concentration of from about 5 to about 45 percent of the emulsion by weight.

20. The emulsion according to claim 1 wherein said fat extending composition is selected from the group consisting of dextrins, maltodextrins, modified starches, microcrystalline cellulose, polydextrose, and microparticulated protein; and combinations thereof.

21. The emulsion according to claim 1 wherein at least a portion of said fat or oil is replaced by an incompletely digestible fat mimetic.

22. The emulsion according to claim 21 wherein said fat mimetic is selected from the group consisting of sugar fatty acid polyesters, polyol fatty acid polyesters, polyglycerol fatty acid polyesters, fatty acid/fatty alcohol carboxy/carboxylate esters, fatty acid esters of epoxide-extended polyols, polysiloxanes, polyoxyalkylene fatty acid esters, fatty alcohol esters of polycarboxylic acids, malonic acid fatty alcohol diesters, alkyl malonic acid fatty alcohol diesters, dialkyl malonic acid fatty alcohol diesters, alkyl glycoside fatty acid polyesters, alpha-acylated fatty acid triglycerides, glycerol fatty alcohol diethers, monoglyceride fatty alcohol diethers, and glycerol esters of alpha-branched carboxylic acids.

23. An emulsion according to claim 22 wherein said fat mimetic is sucrose fatty acid polyester.

24. A process for preparing an emulsion comprising:
(a) mixing an aqueous medium, a gel-forming composition, a fat or oil, a fat extending composition, and an appropriate emulsifier;
(b) stirring at a temperature and shear rate sufficient to produce an emulsion or dispersion of the fat or oil with the aqueous medium; and
(c) stirring as said emulsion or dispersion is cooled to a temperature of from about 5° C. to about 30° C.

25. The process according to claim 24 further comprising the addition of at least one suitable pH adjusting agent.

26. The process according to claim 25 wherein said pH adjusting agent is selected from the group consisting of acids selected from the group consisting of phosphoric, acetic, lactic, fumaric, malic, adipic, tartaric, citric, hydrochloric, and sulfuric acids; salts thereof; glucono delta lactone; and combinations thereof.

27. A process according to claim 24 wherein said fat extender is present at a concentration of from about 5 to about 45 percent of the emulsion by weight.

28. A process according to claim 24 wherein said fat extender is selected from the group consisting of dextrins, maltodextrins, modified starches, microcrystalline cellulose, polydextrose, and microparticulated protein; and combinations thereof.

29. A process according to claim 24 wherein at least a portion of said fat or oil is replaced by an incompletely digestible fat mimetic compound.

30. A process according to claim 29 wherein said fat mimetic compound is selected from the group consisting of sugar fatty acid polyesters, polyol fatty acid polyesters, polyglycerol fatty acid polyesters, fatty acid/fatty alcohol carboxy/carboxylate esters, fatty acid esters of epoxide-extended polyols, polysiloxanes, polyoxyalkylene fatty acid esters, fatty alcohol esters of polycarboxylic acids, malonic acid fatty alcohol diesters, alkyl malonic acid fatty alcohol diesters, dialkyl malonic acid fatty alcohol diesters, alkyl glycoside fatty acid polyesters, alpha-acylated fatty acid triglycerides, glycerol fatty alcohol diethers, monoglyceride fatty alcohol diethers, and glycerol esters of alpha-branched carboxylic acids.

31. A triglyceride containing foodstuff having at least a portion of the normally present triglyceride replaced by the emulsion of claim 1.

32. A foodstuff according to claim 31 wherein said foodstuff is selected from the group consisting of frozen desserts, salad dressings, dips for crackers, chips or vegetables, spreads, confections having normally present triglycerides, whipped toppings, frostings, fillings for cakes or cookies, whipped desserts, gelled desserts, puddings, beverages, soups, and baked goods.

33. A foodstuff having at least a portion of the normally present triglyceride replaced by an emulsion comprising:
(a) from about 1 to about 95% of an aqueous phase rendered non-flowable by the addition of a suitable amount of a gel-forming composition and
(b) from about 5 to about 99 percent of an oil phase comprising a fat or oil and an emulsifier; and
(c) from about 1 to about 90 percent of a fat extender, said emulsion processed to render said emulsion nonpourable.

34. A foodstuff according to claim 33 wherein said food stuff is selected from the group consisting of frozen desserts, salad dressings, dips for crackers, chips or vegetables, spreads, whipped toppings, confections containing triglycerides, frosting or icing for cakes and cookies, fillings for cakes or cookies, whipped desserts, gelled dessert, puddings, beverages, soups and baked goods.

35. A method of reducing the fat content of a food containing triglycerides comprising replacing at least a portion of the normally present triglyceride with an emulsion comprising:

(a) from about 1 to about 95% of an aqueous phase rendered non-flowable by the addition of a suitable amount of a gel-forming composition and a fat extender; and
(b) from about 5 to about 99 percent of an oil phase comprising a fat or oil and an emulsifier; and
(c) from about 1 to about 90 percent of a fat extender; said emulsion processed to render said emulsion nonpourable.

36. A method according to claim 35 wherein said food is selected from the group consisting of frozen desserts, salad dressings, dips for chips, crackers or vegetables, spreads, confections, whipped toppings, frostings or icings for cakes or cookies, fillings for cakes or cookies, whipped desserts, gelled desserts, puddings, beverages, soups and baked goods.

37. The method of claim 35 wherein at least a part of said fat or oil is replaced by an incompletely digestible fat mimetic compound.

38. A method of reducing the fat content of a food containing triglycerides comprising replacing at least a portion of the normally present triglyceride with an emulsion of claim 1.

39. A method according to claim 38 wherein said food is selected from the group consisting- of frozen desserts, salad dressings, dips for chips, crackers or vegetables, spreads, confections, whipped toppings, frostings or icings for cakes or cookies, fillings for cakes or cookies, whipped desserts, gelled desserts, puddings, beverages, soups and baked goods.

40. A two phase emulsion useful as a low calorie fat substitute comprising:
(a) from about 1 to about 95 percent of an aqueous phase rendered non-flowable by the addition of a suitable amount of a gel-forming composition;
(b) from about 5 to about 99 percent of an oil phase comprising a fat mimetic and an emulsifier.

41. A foodstuff containing the emulsion of claim 40.

42. A foodstuff containing the emulsion of claim 40 wherein said foodstuff is selected from the group consisting of frozen desserts, salad dressings, dips for chips, crackers or vegetables, spreads, confections, whipped toppings, frostings or icings for cakes or cookies, fillings for cakes or cookies, fillings for cakes or cookies, whipped desserts, gelled desserts, puddings, beverages, soups and baked goods.

43. The emulsion according to claim 40 wherein the interaction between the concentration of components (a) and (b) results in said emulsion being pourable.

44. The emulsion according to claim 40 wherein said emulsion is processed to render said emulsion nonpourable.

45. A foodstuff containing the emulsion of claim 43.

46. A foodstuff of claim 45 wherein said foodstuff is selected from the group consisting of frozen desserts, salad dressings, dips for chips, crackers and vegetables, spreads, confections, whipped toppings, frostings or icings for cakes or cookies, fillings for cakes or cookies, whipped desserts, gelled desserts, puddings, beverages, soups and baked goods.

47. A foodstuff containing the emulsion of claim 44.

48. A foodstuff of claim 47 wherein said foodstuff is selected from the group consisting of frozen desserts, salad dressings, dips for chips, crackers or vegetables, spreads, confections, whipped toppings, frostings or icings for cakes or cookies, fillings for cakes or cookies, fillings for cakes or cookies, whipped desserts, gelled desserts, puddings, beverages, soups and baked goods.

49. A method of reducing the fat content of a food containing triglycerides comprising replacing at least a portion of the normally present triglyceride with an emulsion of claim 40.

50. A method according to claim 49 wherein said food is selected from the group consisting of frozen desserts, salad dressings, dips for chips, crackers or vegetables, spreads, confections, whipped toppings, frostings or icings for cakes or cookies, fillings for cakes or cookies, whipped desserts, gelled desserts, puddings, beverages, soups and baked goods.

51. A method of reducing the fat content of a food containing triglycerides comprising replacing at least a portion of the normally present triglyceride with an emulsion of claim 43.

52. A method according to claim 51 wherein said food is selected from the group consisting of frozen desserts, salad dressings, dips for chips, crackers or vegetables, spreads, confections, whipped toppings, frostings or icings for cakes or cookies, fillings for cakes or cookies, whipped desserts, gelled desserts, puddings, beverages, soups and baked goods.

53. A method of reducing the fat content of a food containing triglycerides comprising replacing at least a portion of the normally present triglyceride with an emulsion of claim 44.

54. A method according to claim 53 wherein said food is selected from the group consisting of frozen desserts, salad dressings, confections, whipped toppings, frostings or icings for cakes or cookies, fillings for cakes or cookies, whipped desserts, gelled desserts, puddings, beverages, soups and baked goods.

* * * * *